United States Patent
Brayman et al.

(10) Patent No.: US 7,798,306 B2
(45) Date of Patent: Sep. 21, 2010

(54) RETRACTABLE DIVERTER NOSE

(75) Inventors: Matthew T. Brayman, Grand Rapids, MI (US); Steven M. DeMan, Belmont, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 12/273,644

(22) Filed: Nov. 19, 2008

(65) Prior Publication Data
US 2009/0139834 A1    Jun. 4, 2009

Related U.S. Application Data

(60) Provisional application No. 60/991,364, filed on Nov. 30, 2007.

(51) Int. Cl.
*B65G 47/46* (2006.01)
(52) U.S. Cl. .................................. 198/370.02
(58) Field of Classification Search ................ 198/370.02–370.05
See application file for complete search history.

(56) References Cited

U.S. PATENT DOCUMENTS

| | | | | |
|---|---|---|---|---|
| 3,542,215 A | * | 11/1970 | Fromme et al. | 198/349.6 |
| 4,971,190 A | * | 11/1990 | Berends et al. | 198/370.02 |
| 5,131,522 A | * | 7/1992 | Fujio | 198/370.02 |
| 5,135,100 A | * | 8/1992 | Cotter et al. | 198/370.02 |
| 5,217,105 A | * | 6/1993 | Sapp et al. | 198/370.02 |
| 5,275,273 A | * | 1/1994 | Veit et al. | 198/890 |
| 5,409,095 A | | 4/1995 | Hoshi et al. | |
| 6,705,452 B2 | * | 3/2004 | Greve et al. | 198/370.02 |
| 7,431,140 B2 | * | 10/2008 | Tarlton | 198/370.02 |

OTHER PUBLICATIONS

Exhibit A illustrates a prior art model 2421 divert nose absorber and magnetic divert switch assembly.

* cited by examiner

*Primary Examiner*—Mark A Deuble
(74) *Attorney, Agent, or Firm*—Van Dyke, Gardner, Linn & Buckhart, LLP

(57) ABSTRACT

A diverter assembly for a positive displacement sorter apparatus having a plurality of interconnected slats that define a conveying surface adapted to convey articles in a longitudinal direction and having a plurality of pusher shoes adapted to move along at least one of the plurality of slats to laterally displace articles on the conveying surface. The diverter assembly includes a diverting track extending diagonally under the conveying surface and an actuator is provided for selectively diverting at least one of the pusher shoes toward the diverting track. A diverter nose is adapted to guide the pusher shoe to the diverting track when diverted by the actuator or to guide the pusher shoe away from said diverting track when not diverted by said actuator. At least a portion of said diverter nose is adapted to move laterally and longitudinally when struck generally head-on by a portion of a pusher shoe.

29 Claims, 11 Drawing Sheets

RETRACTABLE DIVERTER NOSE

CROSS REFERENCE TO RELATED APPLICATION

This application claims priority from U.S. provisional patent application Ser. No. 60/991,364 filed on Nov. 30, 2007, the disclosure of which is hereby incorporated herein by reference in its entirety.

FIELD OF THE INVENTION

This invention relates generally to conveyor sortation systems and, in particular, to a positive displacement sorter.

BACKGROUND OF THE INVENTION

Positive displacement sortation conveyors have a main conveying surface and pusher shoes that are generally used to displace articles laterally on the main conveying surface, such as when the articles are to be diverted upon one or more spur conveyor lines typically placed at an angle to the main conveying surface. Pusher shoes are selectively diverted by an actuator which operates upon a portion of the pusher shoe extending below the conveying surface. The actuator either diverts a pusher shoe to a diverting rail to divert that pusher shoe or allows the pusher shoe to continue to travel along a non-diverted path. A wedge-shaped component, sometimes referred to as a nose, may be positioned between the diverted path defined by the diverting rail and the non-diverted path to help guide the pusher shoe toward one path or the other.

SUMMARY OF THE INVENTION

A diverter assembly for a positive displacement sorter apparatus having a plurality of interconnected slats that define a conveying surface adapted to convey articles in a longitudinal direction and having a plurality of pusher shoes adapted to move along at least one of the plurality of slats to laterally displace articles on the conveying surface, according to an aspect of the invention, includes a diverting track extending diagonally under the conveying surface. An actuator is provided for selectively diverting at least one of the pusher shoes toward the diverting track. A diverter nose is adapted to guide the pusher shoe to the diverting track when diverted by the actuator or to guide the pusher shoe away from said diverting track when not diverted by said actuator. At least a portion of said diverter nose is adapted to move laterally and longitudinally when struck generally head-on by a portion of a pusher shoe.

These and other objects, advantages and features of this invention will become apparent upon review of the following specification in conjunction with the drawings.

DESCRIPTION OF THE PREFERRED EMBODIMENTS

Figure 1:
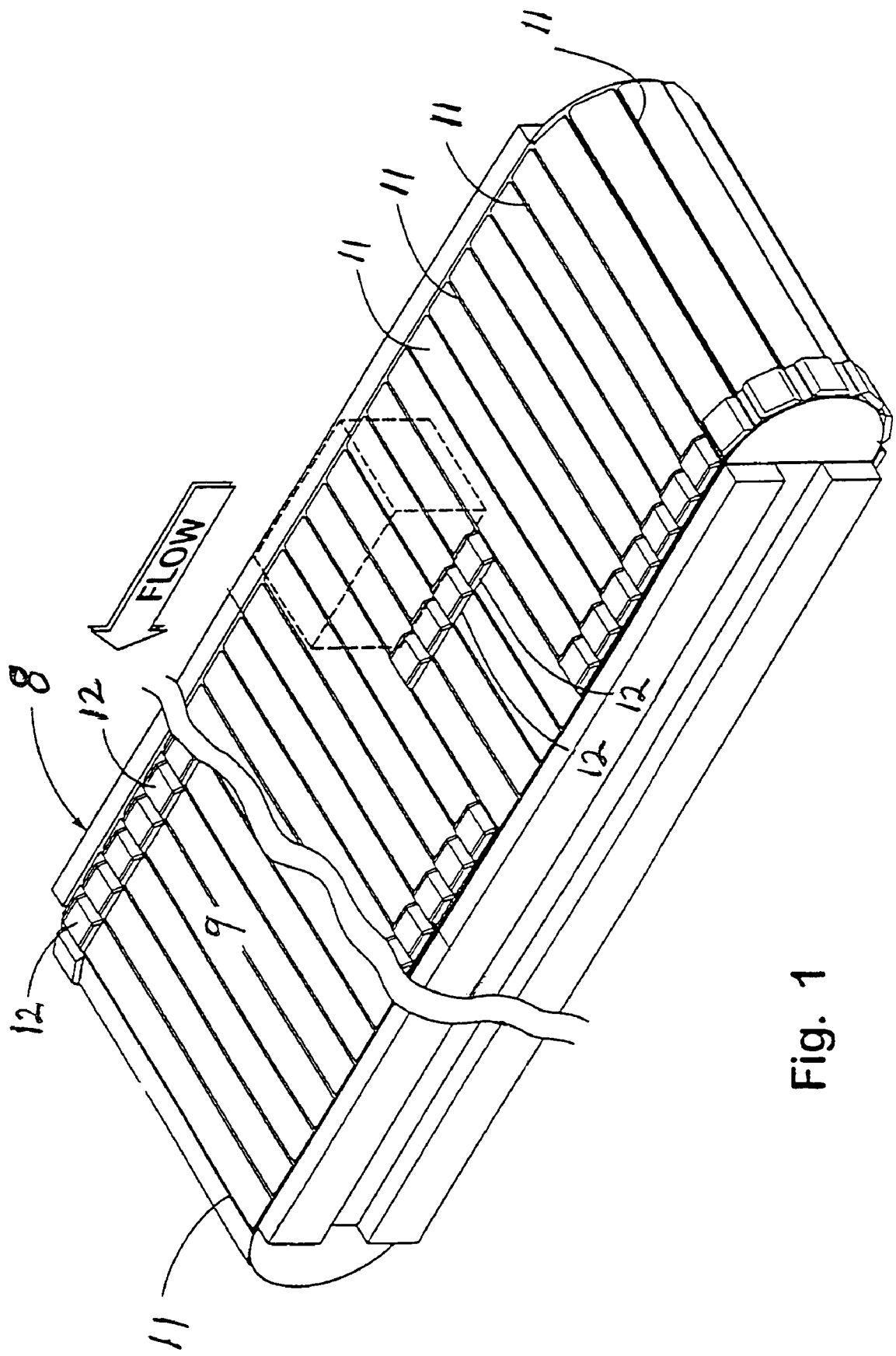
FIG. 1 is a top plan view of a sorter apparatus having a plurality of diverter assemblies according to the present invention.

Referring now to the drawings and the embodiments illustrated therein, a sorter apparatus 8 includes a conveying surface 9, defined by the upper surfaces of a plurality of slats 11 interconnected in an endless web, and a plurality of pusher shoes 12, each traveling along one or more slats to divert an article on conveying surface 9 (FIG. 1). Sorter apparatus 8 may be a positive displacement sortation of the type disclosed in commonly assigned U.S. Pat. Nos. 5,127,510; 6,814,216 and 6,860,383, the disclosures of which are hereby incorporated herein by reference. Movement of the shoes is guided by a diagonal guide rail defining a diverting track 14 beneath the conveying surface or a longitudinally extending non-diverted path 15. At the loading end of the sortation system, the shoes initially follow the longitudinal direction of the conveying surface along non-diverted path 15. When an article is to be diverted to a particular spur line, an actuator 16 is actuated to transfer the shoes adjacent the article from the non-diverted path onto one or more diverting tracks 14, causing the effected shoes to travel across the slats to divert the article. At the point of transfer from the longitudinal track, the shoes are directed around a diverter nose 18, which has a pointed surface which is divided and extends to both the non-diverted and the diverted paths. Diverter nose 18 is adapted to guide shoe 12 into diverting track 14 or non-diverting path 15. More particularly, diverter nose 18 includes a first set of generally vertical surfaces 28a, 28b that guide a non-diverted pusher shoe toward non-diverted path 15 and a second set of generally vertical surfaces 29a, 29b that guide a diverted pusher shoe to diverting track 14.

Each diverter assembly 10 includes at least a portion of diverting track 14 extending diagonally under the conveying surface (FIGS. 1-5). In the illustrated embodiment, diverting track 14 extends at an angle from the non-diverted track 15. Diverter assembly 10 also includes one or more actuators 16 for selectively transferring a diverter shoe toward and into diverting track 14. Actuator 16 may be magnetic as disclosed in U.S. Pat. No. 5,409,095 entitled SORTING APPARATUS, the disclosure of which is hereby incorporated herein by reference, mechanical, pneumatic or a combination, such as disclosed in U.S. Pat. No. 5,038,912 entitled VERTICALLY ACTUATED TRANSFER SWITCH, the disclosure of which is hereby incorporated herein by reference. Unless actuator 16 is actuated, the diverter shoe travels in non-diverted path 15.

Figure 1A:
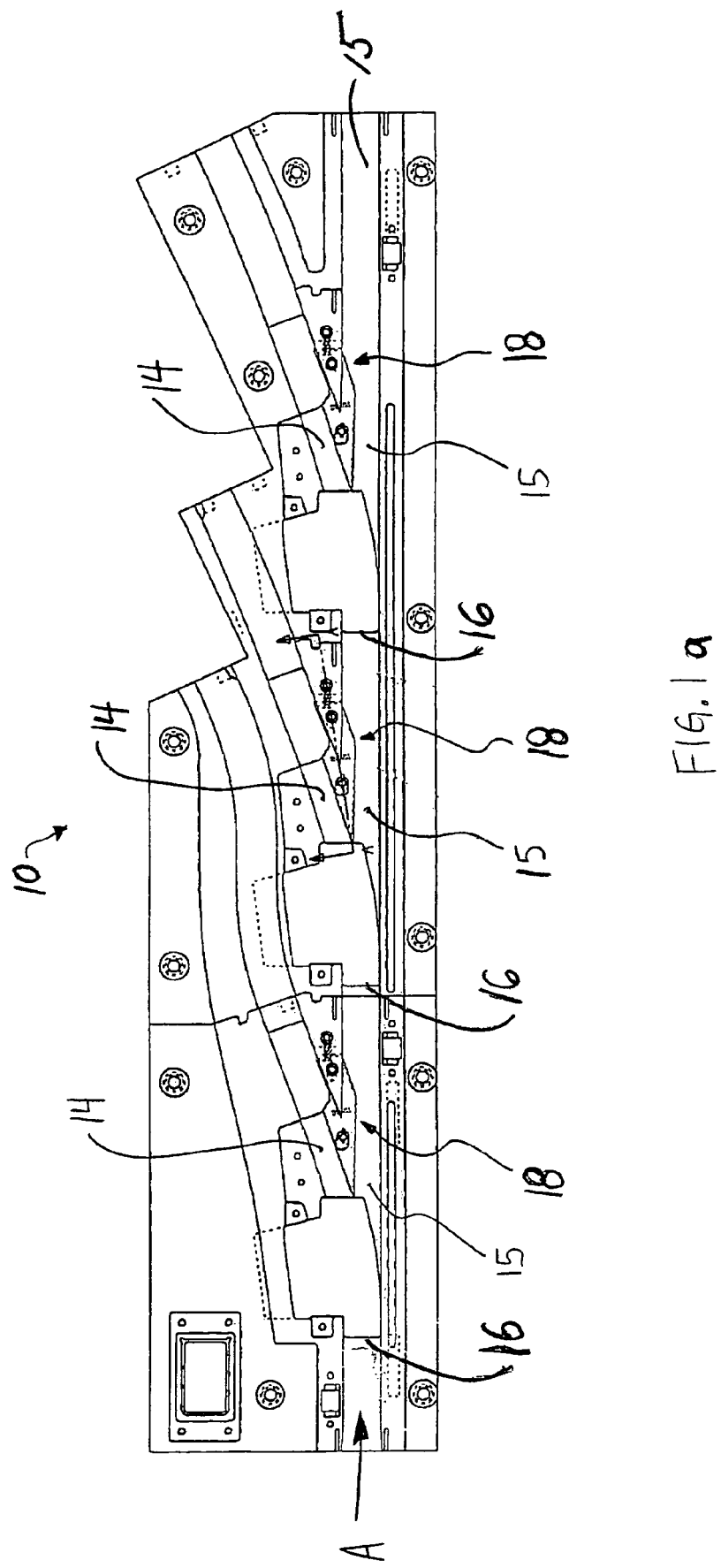
FIG. 1a is a top plan view of a diverter assembly.
Figure 2:
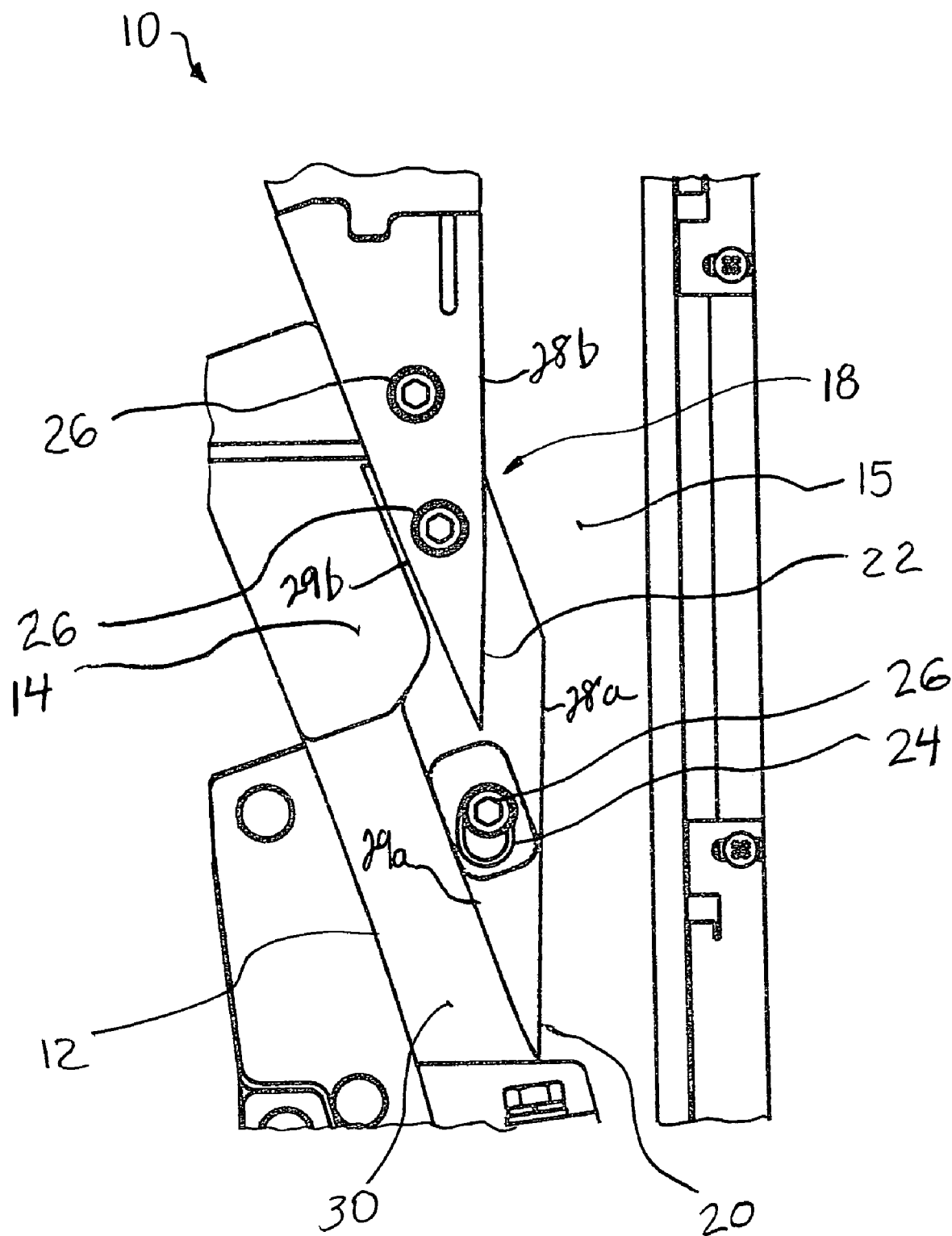
FIG. 2 is a top plan view of one of the diverter switches of FIG. 1 with the diverter nose in an extended position.
Figure 3:
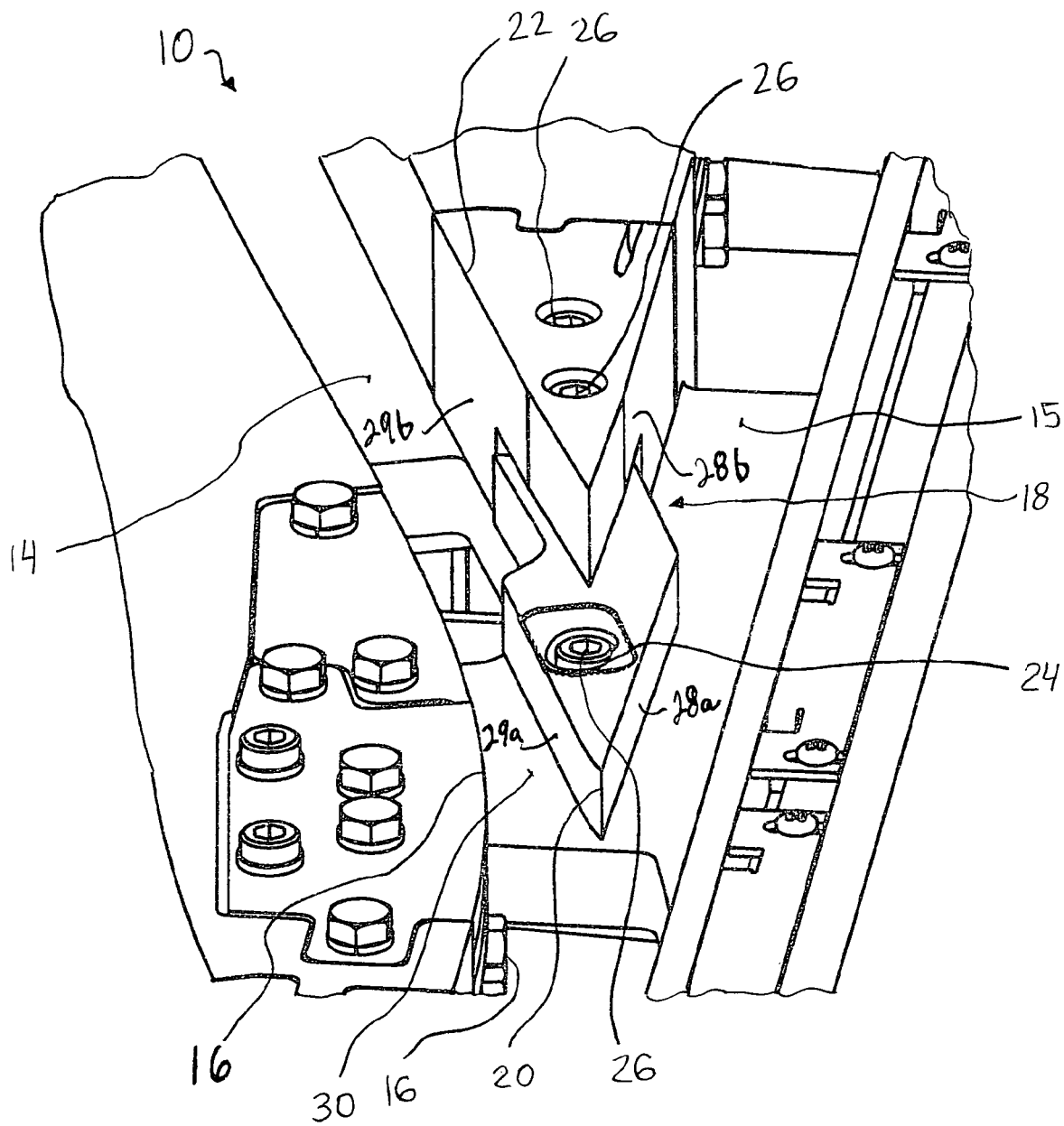
FIG. 3 is a perspective view of the diverter assembly of FIG. 1, with the diverter nose in an extended position.
Figure 4:
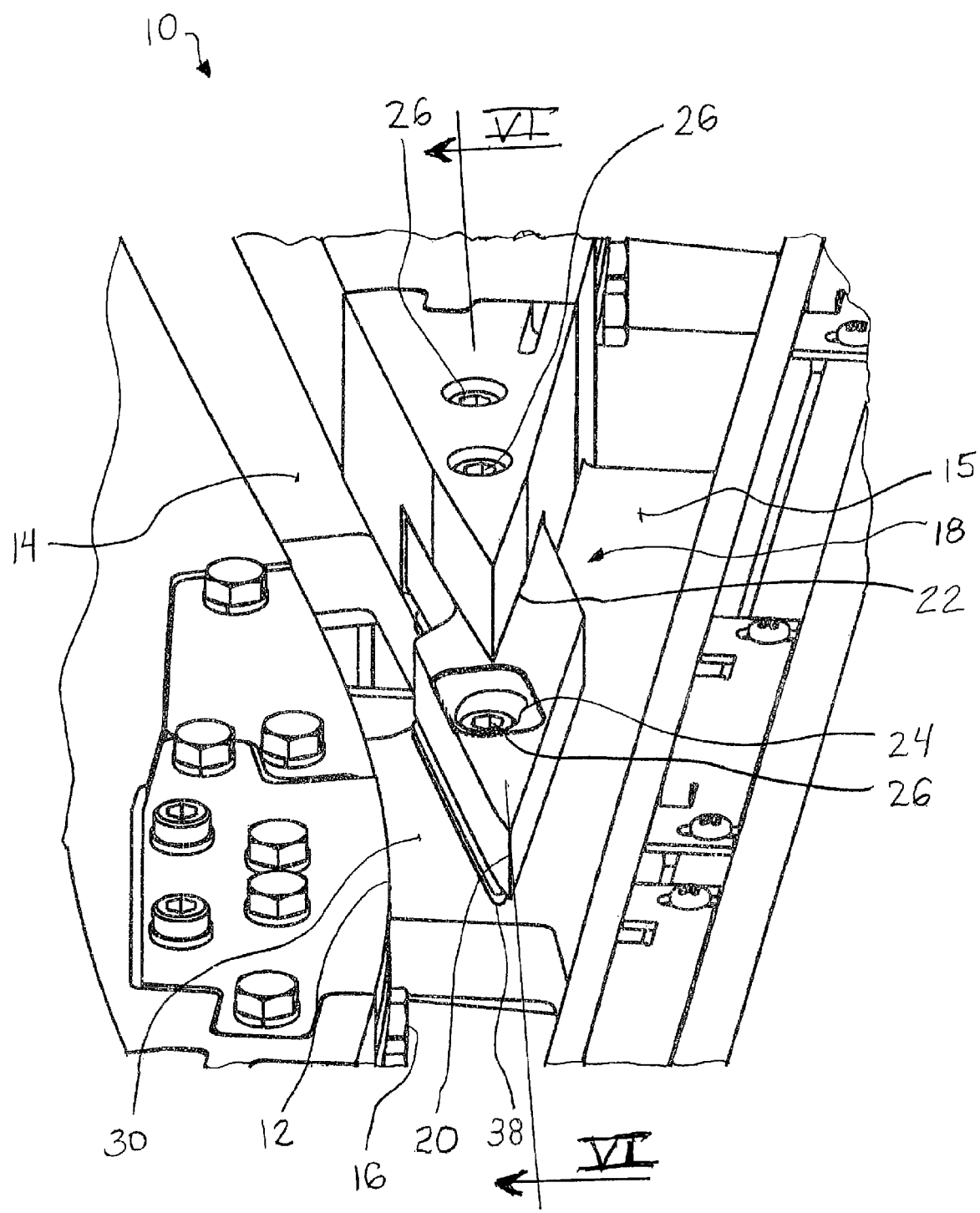
FIG. 4 is the same view as FIG. 3 with the diverter nose in a retracted position.
Figure 5:
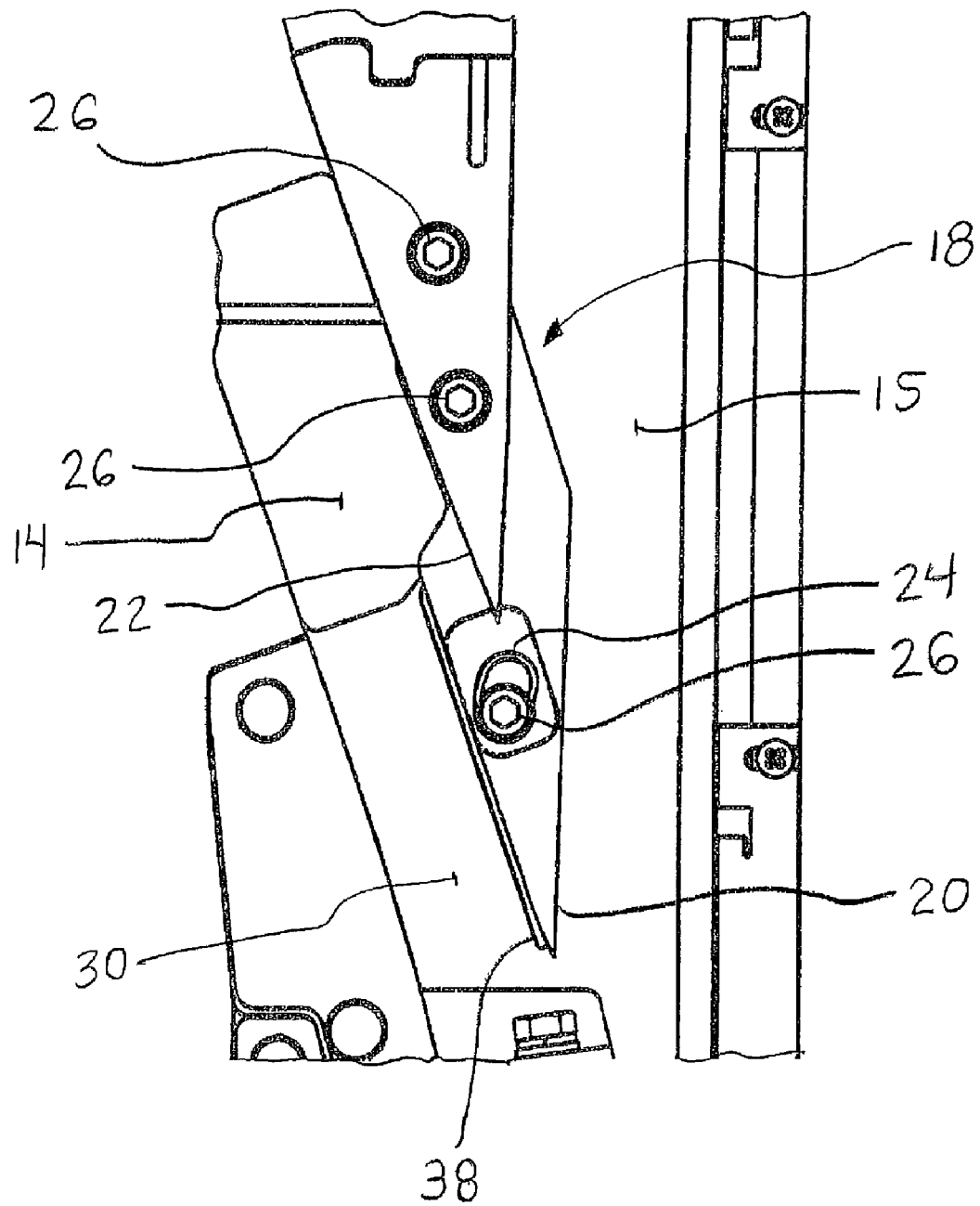
FIG. 5 is the same view as FIG. 2 with the diverter nose in a retracted position.

One or more actuators 16 may be organized into a diverter assembly 10. For diagonal-only diverts of the type disclosed in U.S. Pat. No. 5,127,510, diverter assembly 10 may include only one actuator 16. For sorters capable of performing parallel diverting of articles, as illustrated in FIG. 1, a plurality of actuators 16 may be included in diverter assembly 10, as illustrated in FIG. 1a, to allow a plurality of pusher shoes to be diverted at the same general time to divert the article. In the event, for example, that actuator 16 does not completely or successfully transfer shoe 12 into diverting track 14, shoe 12 may impact diverter nose 18 head-on. In response to the impact, diverter nose 18 is adapted to retract, such that diverter nose 18 absorbs the impact. Additionally, as will be explained in more detail below, at least a portion of diverter nose 18 also moves laterally upon head-on impact in a manner that tends to direct the impacting pusher shoe away from the diverting track 14 to increase the opening to the diverting track.

In the illustrated embodiment, diverter nose 18 includes a retractable wedge 20 and a support element 22 for supporting wedge 20. Wedge 20 may include at least one slot 24 therethrough, which is adapted to receive a rod or fastener 26. Rod 26 may be fixed, such that the retraction or motion of diverter nose 18 is limited to rod 26 in slot 24. Support element 22 is stationary and may be fixed or otherwise connected to rod 26. While wedge 20 retracts in response to an impact from shoe 12, support element 22 remains stationary with respect to sorter apparatus 8 and guides the retraction or motion of wedge 20. However, it should be understood that other configurations are possible, such as the rod or fastener being fixed to the wedge and received in a slot in the support element, or the like. Both wedge 20 and support element 22 may be generally wedge-shaped and may be positioned in sorter apparatus 8, such that they form a division or partition between diverting track 14 and longitudinal track 15.

Figure 6:
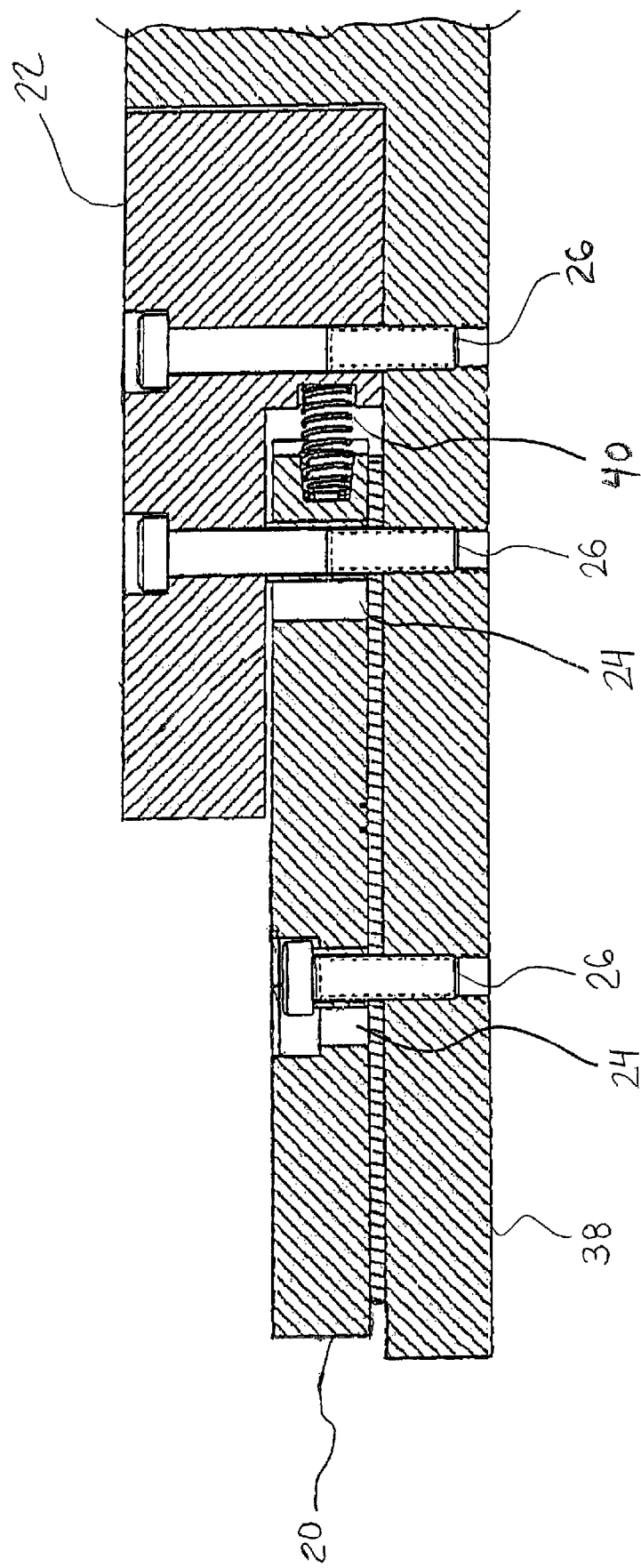
FIG. 6 is a sectional view taken along the lines VI-VI in FIG. 4.

As an additional alternative, wedge 20 may include two slots, each adapted to receive a rod 26. In such a configuration, one of the rods may be fixedly connected to support elements 22 while the other of the rods may be fixedly connected to the portion of the sorter apparatus 8, positioned beneath wedge 20 (FIG. 6). Optionally, a plate 38 may be positioned between wedge 20 and sorter apparatus 8. Plate 38 provides a surface on which wedge 20 is adapted to slide when diverter nose 18 retracts.

The impact force causing the retracting motion of diverter nose 18 may be absorbed or otherwise contained by a spring 40 (FIG. 6). In the illustrated embodiment, spring 40 is positioned between wedge 20 and support element 22. When diverter nose 18 retracts, wedge 20 compresses spring 40 against support element 22. Thus, spring 40 absorbs the impact force from the pusher shoe 12 and controls the retracting motion of diverter nose 18.

Figure 7:
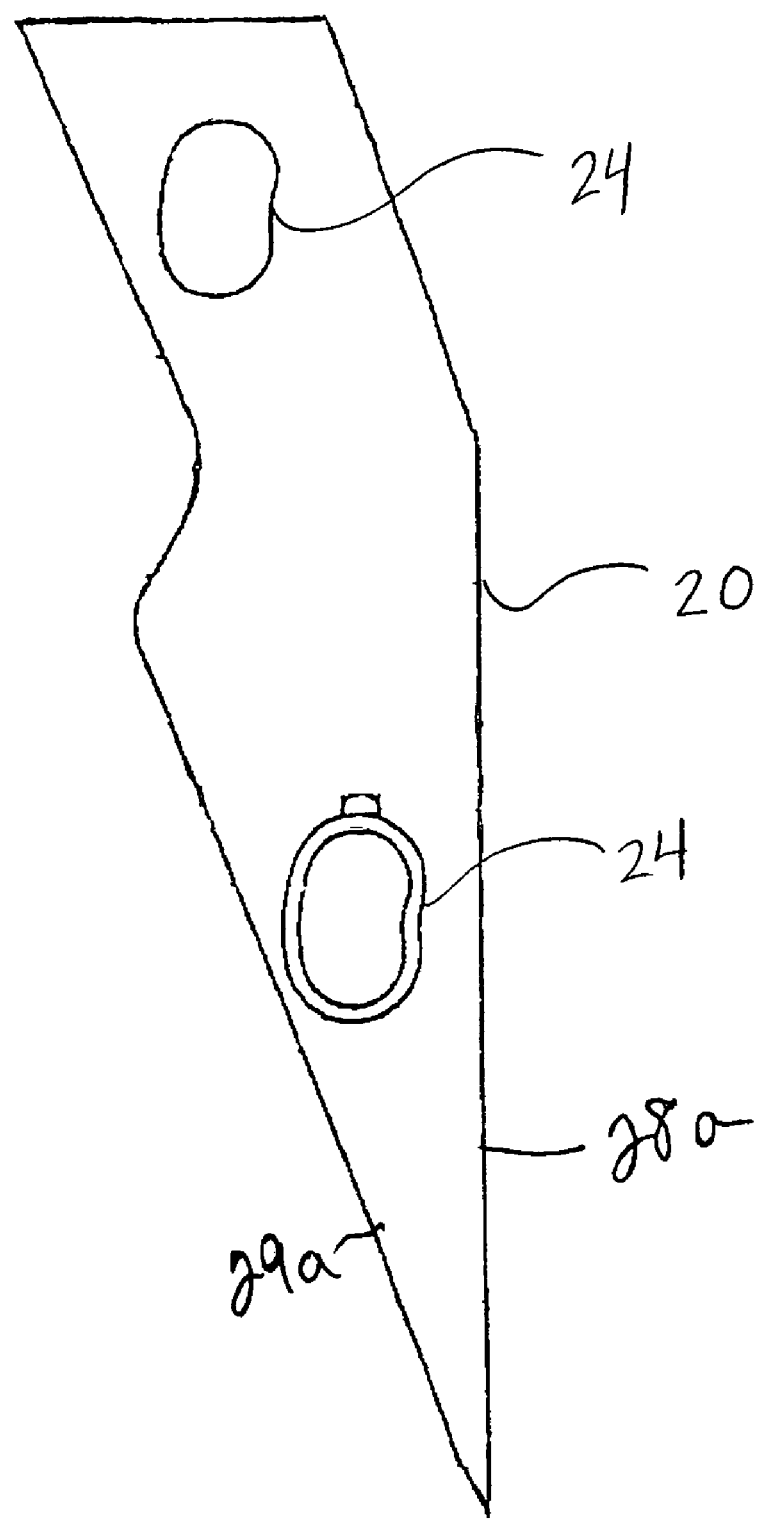
FIG. 7 is a top plan view of a diverter nose.
Figure 8:
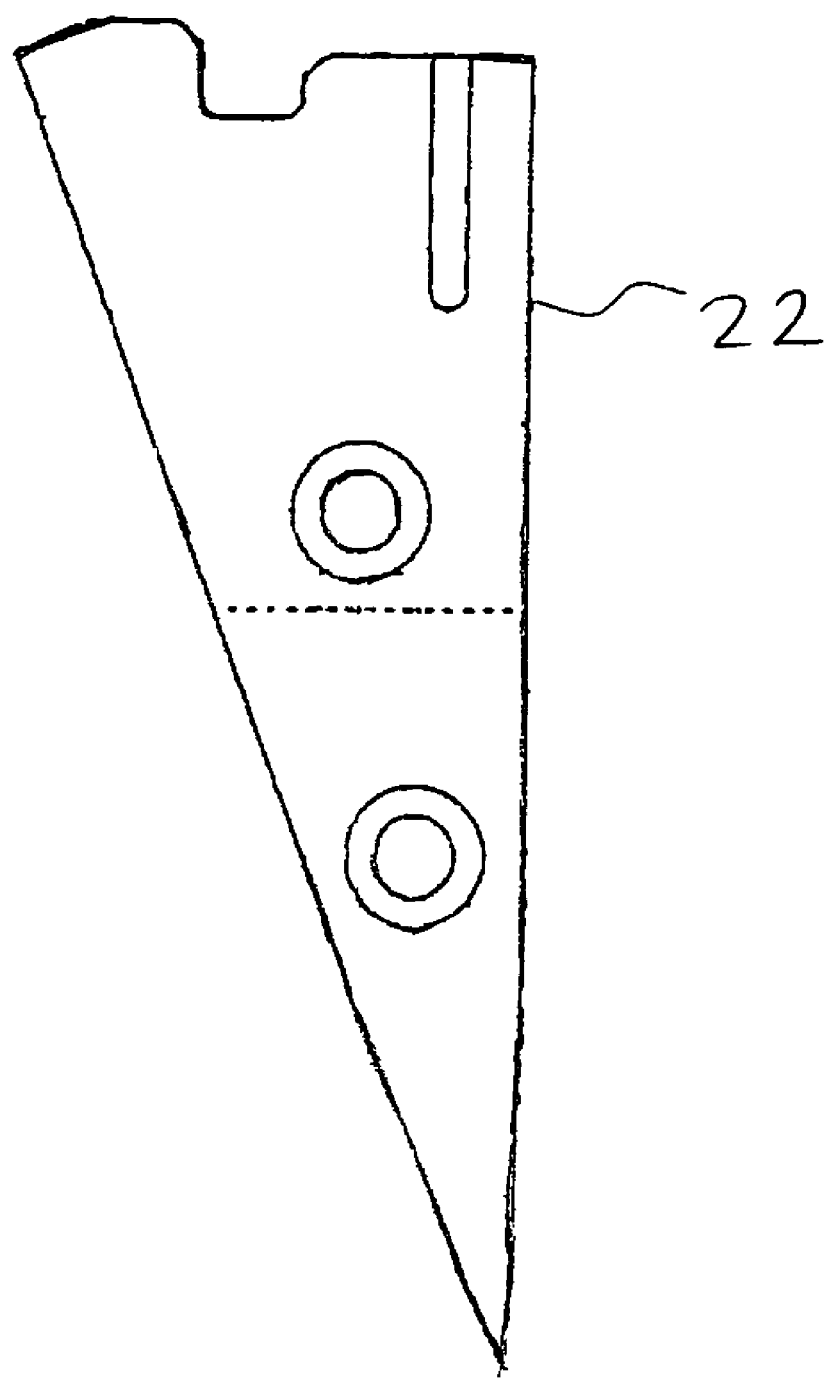
FIG. 8 is a top plan view of a support element.
Figure 9:
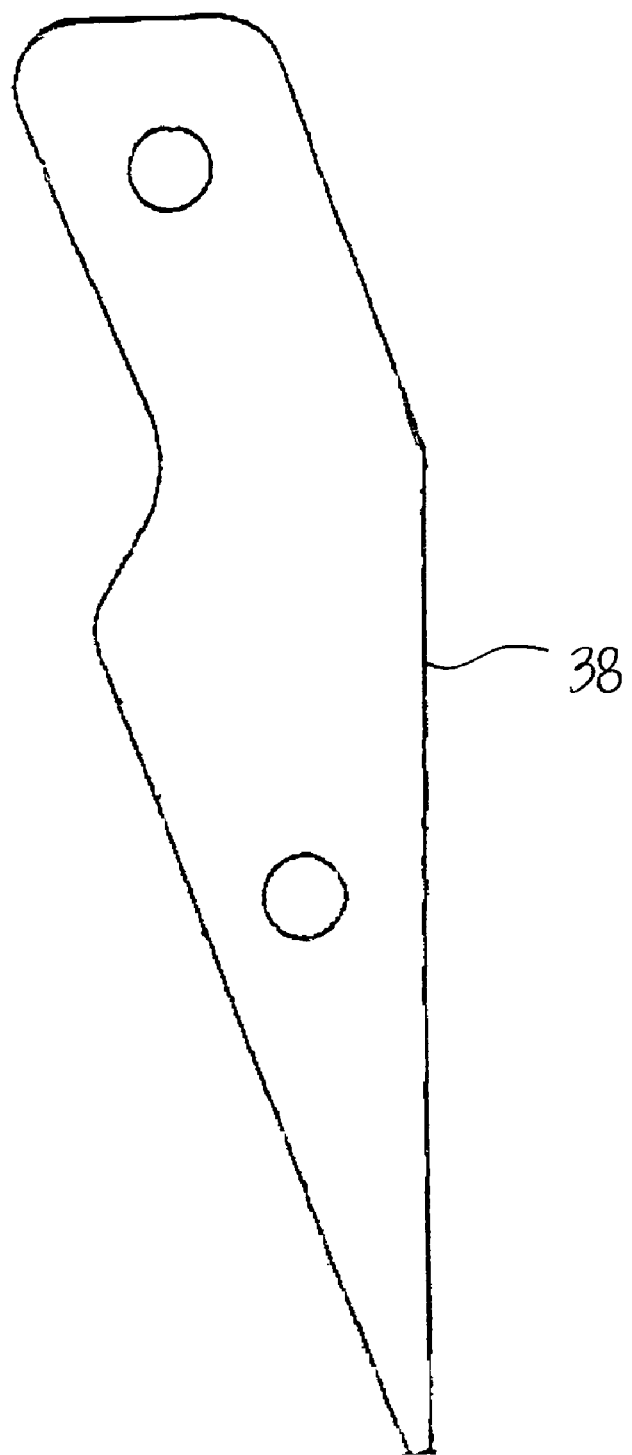
FIG. 9 is a top plan view of a plate adapted to be mounted under the diverter nose of FIG. 5.

As best seen by reference to FIG. 7, slots 24 may be both elongated and non-uniform in shape. This non-uniform shape, illustrated as a kidney shape, provides a lateral component to the movement of the wedge 20 when the wedge is retracted in response to being impacted by a pusher shoe. In particular, the configuration of slots 24 cause at least the leading edge of the wedge to move laterally toward the direction of the non-diverting path 15 and may also result in a rotational motion to the wedge. This causes the wedge to expose more of vertical surface 29a to the pusher shoe and increases the opening size of the diverting track 14. This causes a pusher shoe that contacts wedge 20 to be urged in the direction of the diverting track. This is based upon a belief that a pusher shoe most likely contacts wedge 20 head-on when actuator 16 attempts to divert the pusher shoe but somehow is unable to fully divert the pusher shoe. Thus, a partially-diverted pusher shoe will be urged in the direction of the diverting track. Alternatively, wedge 20 could be provided with slots 24 that are oriented opposite to those disclosed herein, in which case, the wedge would tend to respond to a head-on impact by urging the pusher shoe towards the non-diverting path 15.

Figure 10:
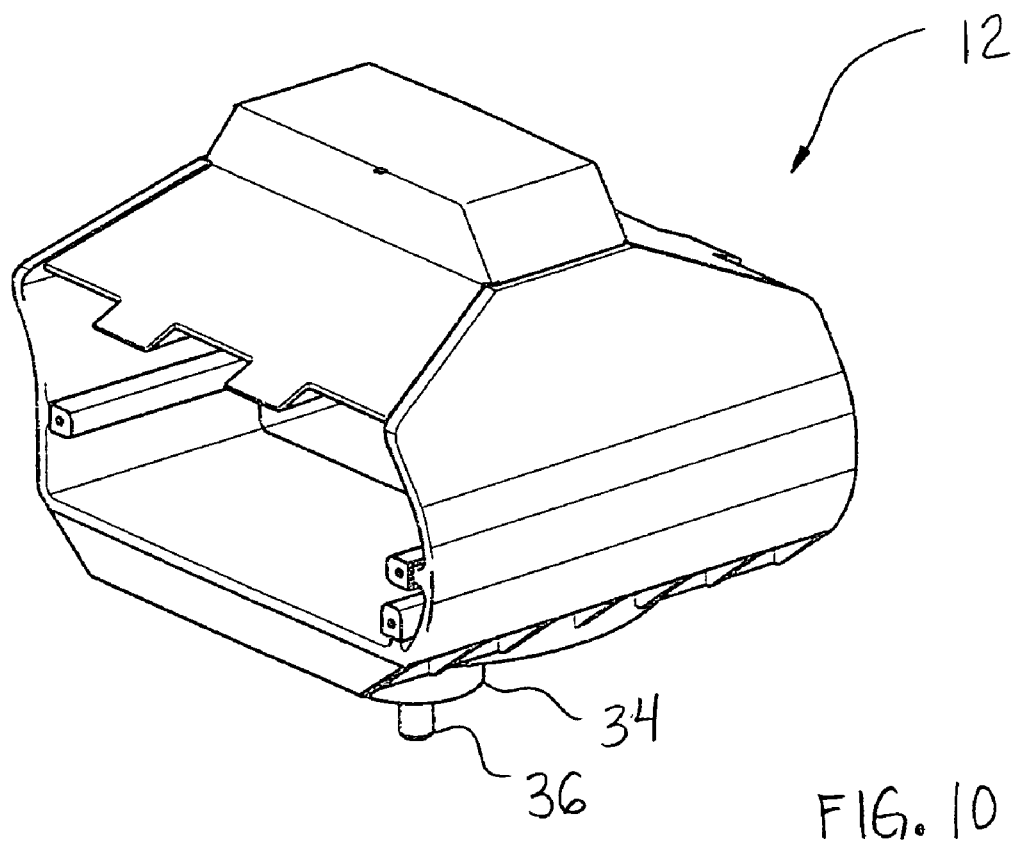
FIG. 10 is a perspective view of a pusher shoe.
Figure 11:
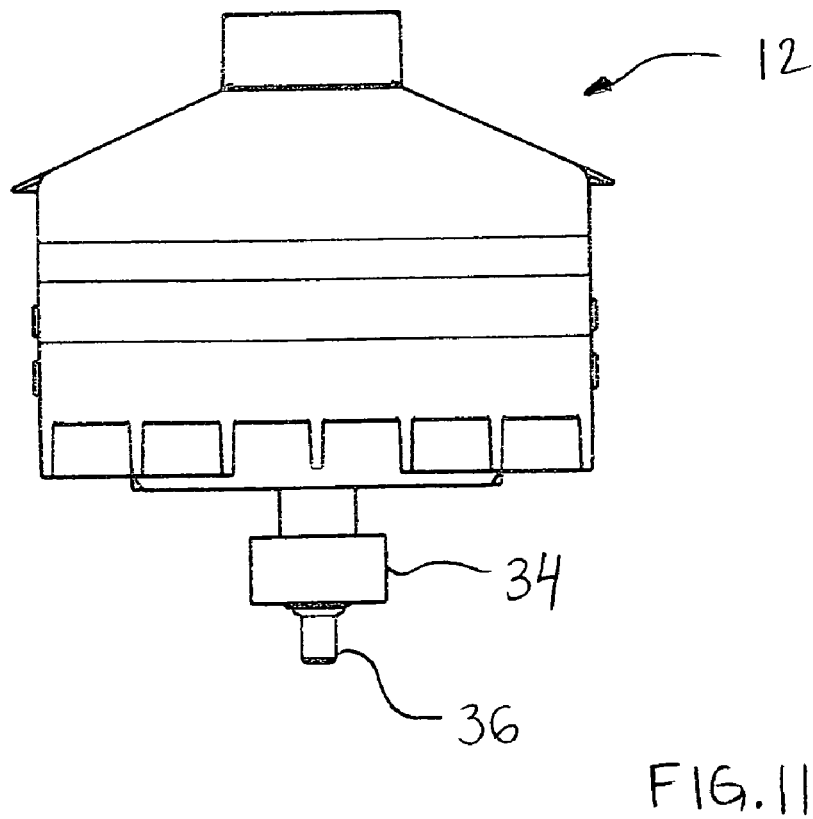
FIG. 11 is a side elevation of the pusher shoe of FIG. 9.

Wedge 20 may be configured to engage a portion of pusher shoe 12 extending below slats 11, such as pin 36 of pusher shoe 12 (FIGS. 10 and 11). Support element 22 is configured to engage bearing 34 of the pusher shoe. This is a result of the positioning of wedge 20 generally forward of and below support 22. Thus, a pusher shoe contacting diverting nose 18 will have its pin 36 either engage the wedge head-on or will engage one of the vertical surfaces 28a, 29a. If one of the vertical surfaces 28a, 29a is contacted, the pusher shoe will be diverted respectively either along the non-diverting path or to the diverting rail. If the wedge is contacted head-on, the wedge becomes reoriented in response to the head-on impact. Subsequent to engaging wedge 20, bearing 34 of the pusher shoe engages vertical surface 28b, 29b in order to continue to move the pusher shoe along the non-diverting path or toward the diverting rail. By the time that the bearing engages vertical surface 28b, 29b, the pusher shoe will already be on its path towards being diverted or non-diverted. The engagement of wedge 20 by pin 36 provides a smaller surface for engaging the wedge, thereby reducing the opportunity for a head-on impact.

Changes and modifications to the specifically described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A diverter assembly for a positive displacement sorter apparatus having a plurality of interconnected slats that define a conveying surface adapted to convey articles in a longitudinal direction and having a plurality of pusher shoes adapted to move along at least one of the plurality of slats to laterally displace articles on the conveying surface, said diverter assembly comprising:

a diverting track extending diagonally under the conveying surface;

an actuator for selectively diverting at least one of the pusher shoes toward said diverting track; and a diverter nose positioned downstream of said actuator in the direction of movement of the pusher shoes, said diverter nose adapted to guide a pusher shoe that is at least partially diverted by said actuator to said diverting track even if that pusher shoe is not completely diverted by said actuator, said diverter nose further adapted to guide a pusher shoe away from said diverting track when that pusher shoe is not at least partially diverted by said actuator;

wherein at least a portion of said diverter nose is adapted to move laterally and longitudinally when struck generally head-on by a portion of a pusher shoe to absorb impact of that pusher shoe and to move out of the way of that pusher shoe.

2. The diverter assembly as claimed in claim 1, wherein said portion of said diverter nose is adapted to move laterally in a manner that facilitates movement of the pusher shoe toward the diverting rail when struck head-on by the portion of the pusher shoe.

3. The diverter apparatus as claimed in claim 2, wherein said portion of said diverter nose is adapted to widen an entrance to said diverting track to facilitate movement of the pusher shoe toward said diverting rail when struck head-on by the portion of the pusher shoe.

4. The diverter assembly as claimed in claim 1, wherein said portion of said diverter nose includes a wedge adapted to move when struck head-on by the portion of the pusher shoe and a stationary support element for moveably supporting said wedge.

5. A diverter assembly for a positive displacement sorter apparatus having a plurality of interconnected slats that define a conveying surface adapted to convey articles in a longitudinal direction and having a plurality of pusher shoes adapted to move along at least one of the plurality of slats to laterally displace articles on the conveying surface, said diverter assembly comprising:

a diverting track extending diagonally under the conveying surface;
an actuator for selectively diverting at least one of the pusher shoes toward said diverting track; and
a diverter nose adapted to guide the pusher shoe to said diverting track when diverted by said actuator or to guide the pusher shoe away from said diverting track when not diverted by said actuator;
wherein at least a portion of said diverter nose is adapted to move laterally and longitudinally when struck generally head-on by a portion of a pusher shoe, wherein said portion of said diverter nose includes a wedge adapted to move when struck head-on by the portion of the pusher shoe and a stationary support element for moveably supporting said wedge, wherein one of said wedge and said support element includes at least one slot therethrough and the other of said wedge and said support element includes at least one rod, said at least one slot adapted to receive said at least one rod, wherein said motion of said wedge is guided by said at least one rod in said at least one slot.

6. The diverter assembly as claimed in claim 5, wherein said at least one rod includes at least two rods and wherein said at least one slot includes at least two slots therethrough each adapted to receive one of said rods, wherein one of said rods is fixedly connected to said support element and the other of said rods is fixedly connected to the sorter apparatus.

7. The diverter assembly as claimed in claim 6, wherein said slots and said rods are adapted to guide said wedge laterally away from said diverting track when said wedge retracts.

8. A diverter assembly for a positive displacement sorter apparatus having a plurality of interconnected slats that define a conveying surface adapted to convey articles in a longitudinal direction and having a plurality of pusher shoes adapted to move along at least one of the plurality of slats to laterally displace articles on the conveying surface, said diverter assembly comprising:

a diverting track extending diagonally under the conveying surface;
an actuator for selectively diverting at least one of the pusher shoes toward said diverting track;
a diverter nose adapted to guide the pusher shoe to said diverting track when diverted by said actuator or to guide the pusher shoe away from said diverting track when not diverted by said actuator;
wherein at least a portion of said diverter nose is adapted to move laterally and longitudinally when struck generally head-on by a portion of a pusher shoe, wherein said portion of said diverter nose includes a wedge adapted to move when struck head-on by the portion of the pusher shoe and a stationary support element for moveably supporting said wedge; and
a plate positioned between said wedge and the sorter apparatus, wherein said wedge slides on said plate when said wedge retracts.

9. A diverter assembly for a positive displacement sorter apparatus having a plurality of interconnected slats that define a conveying surface adapted to convey articles in a longitudinal direction and having a plurality of pusher shoes adapted to move along at least one of the plurality of slats to laterally displace articles on the conveying surface, said diverter assembly comprising:

a diverting track extending diagonally under the conveying surface;
an actuator for selectively diverting at least one of the pusher shoes toward said diverting track; and
a diverter nose adapted to guide the pusher shoe to said diverting track when diverted by said actuator or to guide the pusher shoe away from said diverting track when not diverted by said actuator;
wherein at least a portion of said diverter nose is adapted to move laterally and longitudinally when struck generally head-on by a portion of a pusher shoe and wherein said diverter nose includes a spring to absorb impact when said portion of said diverter nose is struck generally head-on by the portion of the pusher shoe.

10. The diverter assembly as claimed in claim 9, wherein said portion of said diverter nose includes a wedge adapted to move when struck head-on by the portion of the pusher shoe and a stationary support element for moveably supporting said wedge and wherein said spring is compressed between said wedge and said support element.

11. The diverter assembly as claimed in claim 10, wherein said wedge defines two diverging surfaces, one adapted to be engaged by a pusher shoe being diverted toward said diverting track and the other adapted to be engaged by a pusher shoe not being diverted, wherein the angles of said diverging surfaces change as said wedge retracts.

12. The diverter assembly as claimed in claim 11, wherein the movement of said wedge causes the portion of the pusher shoe to deflect off of said wedge toward said at least one diverting track, when said diverter nose is struck head-on by a portion of the pusher shoe.

13. The diverter assembly as claimed in claim 12, wherein the portion of the pusher shoe is one chosen from an elongated vane and a pin.

14. The diverter assembly as claimed in claim 13, wherein the pusher shoe includes a bearing for engaging said diverting rail and said support element, wherein said support element guides said bearing toward said diverting track when said actuator diverts that pusher shoe.

15. A positive displacement sorter apparatus, comprising:
a plurality of interconnected slats that define a conveying surface adapted to convey articles in a longitudinal direction;
a plurality of pusher shoes, each adapted to move along at least one of the plurality of slats to laterally displace articles on the conveying surface;
a plurality of diverting assemblies, each including a diverting track extending diagonally under the conveying surface and an actuator adapted to selectively divert at least one of the pusher shoes toward the diverting track;
each of said diverting assemblies further including a diverter nose positioned downstream of said actuator in the direction of movement of the pusher shoes, said diverter nose adapted to guide a pusher shoe that is at least partially diverted by said actuator to said diverting track even if that pusher shoe is not completely diverted by said actuator, said diverter nose further adapted to guide the pusher shoe away from said diverting track when that pusher shoe is not at least partially diverted by said actuator;
wherein at least a portion of said diverter nose is adapted to move laterally and longitudinally when struck generally head-on by a portion of a pusher shoe to absorb impact of that pusher shoe and to move out of the way of that pusher shoe.

16. The positive displacement sorter apparatus as claimed in claim 15, wherein said portion of said diverter nose is adapted to move laterally in a manner that facilitates movement of the pusher shoe toward the diverting rail when struck head-on by the portion of the pusher shoe.

17. The positive displacement sorter apparatus as claimed in claim 16, wherein said portion of said diverter nose is adapted to widen an entrance to said diverting track to facilitate movement of the pusher shoe toward said diverting rail when struck head-on by the portion of the pusher shoe.

18. The positive displacement sorter apparatus as claimed in claim 15, wherein said portion of said diverter nose includes a wedge adapted to move when struck head-on by the portion of the pusher shoe and a stationary support element for moveably supporting said wedge.

19. A positive displacement sorter apparatus, comprising:
a plurality of interconnected slats that define a conveying surface adapted to convey articles in a longitudinal direction;
a plurality of pusher shoes, each adapted to move along at least one of the plurality of slats to laterally displace articles on the conveying surface:
a plurality of diverting assemblies, each including a diverting track extending diagonally under the conveying surface and an actuator adapted to selectively divert at least one of the pusher shoes toward the diverting track;
each of said diverting assemblies further including a diverter nose adapted to guide the pusher shoe to said diverting track when diverted by said actuator or to guide the pusher shoe away from said diverting track when not diverted by said actuator;
wherein at least a portion of said diverter nose is adapted to move laterally and longitudinally when struck generally head-on by a portion of a pusher shoe, wherein said portion of said diverter nose includes a wedge adapted to move when struck head-on by the portion of the pusher shoe and a stationary support element for moveably supporting said wedge wherein one of said wedge and said support element includes at least one slot therethrough and wherein the other of said wedge and said support element includes at least one rod, said at least one slot adapted to receive said at least one rod, wherein said motion of said wedge is guided by said at least one rod in said at least one slot.

20. The positive displacement sorter apparatus as claimed in claim 19, wherein said at least one rod includes at least two rods and wherein said at least one slot includes at least two slots therethrough each adapted to receive one of said rods, wherein one of said rods is fixedly connected to said support element and the other of said rods is fixedly connected to said sorter apparatus, 21. The positive displacement sorter apparatus as claimed in claim 20, wherein said slots and said rods are adapted to guide said wedge laterally away from said diverting track when said wedge retracts.

22. A positive displacement sorter apparatus, comprising:
a plurality of interconnected slats that define a conveying surface adapted to convey articles in a longitudinal direction;
a plurality of pusher shoes, each adapted to move along at least one of the plurality of slats to laterally displace articles on the conveying surface;
a plurality of diverting assemblies, each including a diverting track extending diagonally under the conveying surface and an actuator adapted to selectively divert at least one of the pusher shoes toward the diverting track;
each of said diverting assemblies further including a diverter nose adapted to guide the pusher shoe to said diverting track when diverted by said actuator or to guide the pusher shoe away from said diverting track when not diverted by said actuator;
wherein at least a portion of said diverter nose is adapted to move laterally and longitudinally when struck generally head-on by a portion of a pusher shoe, wherein said portion of said diverter nose includes a wedge adapted to move when struck head-on by the portion of the pusher shoe and a stationary support element for moveably supporting said wedge; and
a plate positioned between said wedge and the sorter apparatus, wherein said wedge slides on said plate when said wedge retracts.

23. A positive displacement sorter apparatus, comprising
a plurality of interconnected slats that define a conveying surface adapted to convey articles in a longitudinal direction;
a plurality of pusher shoes, each adapted to move along at least one of the plurality of slats to laterally displace articles on the conveying surface;
a plurality of diverting assemblies each including a diverting track extending diagonally under the conveying a surface and an actuator adapted to selectively divert at least one of the pusher shoes toward the diverting track;
each of said diverting assemblies further including a diverter nose adapted to guide the pusher shoe to said diverting track when diverted by said actuator or to guide the pusher shoe away from said diverting track when not diverted by said actuator;
wherein at least a portion of said diverter nose is adapted to move laterally and longitudinally when struck generally head-on by a portion of a pusher shoe and wherein said diverter nose includes a spring to absorb impact when said portion of said diverter nose is struck generally head-on by the portion of the pusher shoe.

24. The positive displacement sorter apparatus as claimed in claim 23, wherein said portion of said diverter nose includes a wedge adapted to move when struck head-on by the portion of the pusher shoe and a stationary support element for moveably supporting said wedge and wherein said spring is compressed between said wedge and said support element.

25. The positive displacement sorter apparatus as claimed in claim 24, wherein said wedge defines two diverging surfaces, one adapted to be engaged by a pusher shoe being diverted toward said diverting track and the other adapted to be engaged by a pusher shoe not being diverted, wherein the angles of said diverging surfaces change as said wedge retracts.

26. The positive displacement sorter apparatus as claimed in claim 25, wherein the movement of said wedge causes the portion of the pusher shoe to deflect off of said wedge toward said at least one diverting track, when said diverter nose is struck head-on by a portion of the pusher shoe.

27. The positive displacement sorter apparatus as claimed in claim 26, wherein the portion of the pusher shoe is one chosen from an elongated vane and a pin.

28. The positive displacement sorter apparatus as claimed in claim 27, wherein the pusher shoe includes a bearing for engaging said diverting rail and said support element, wherein said support element guides said bearing toward said diverting track when said actuator diverts that pusher shoe.

29. A diverter assembly for a positive displacement sorter apparatus having a plurality of interconnected slats that define a conveying surface adapted to convey articles in a longitudinal direction and having a plurality of pusher shoes adapted to move along at least one of the plurality of slats to laterally displace articles on the conveying surface, said diverter assembly comprising:

- a diverting track extending diagonally under the conveying surface;
- an actuator for selectively diverting at least one of the pusher shoes toward said diverting track; and
- a diverter nose adapted to guide the pusher shoe to said diverting track when diverted by said actuator or to guide the pusher shoe away from said diverting track when not diverted by said actuator;
- wherein at least a portion of said diverter nose is adapted to move away from said diverting track when struck generally head-on by a portion of a pusher shoe to increase the opening to said diverting track, wherein said portion of said diverter nose includes a wedge adapted to move when struck head-on by the portion of the pusher shoe and a stationary support element for moveably supporting said wedge, wherein one of said wedge and said support element includes at least one slot therethrough and the other of said wedge and said support element includes at least one rod, said at least one slot adapted to receive said at least one rod, wherein said motion of said wedge is guided by said at least one rod in said at least one slot; and
- a spring between said wedge and said support element to absorb impact when said portion of said diverter nose is struck generally head-on by the portion of the pusher shoe.

* * * * *

UNITED STATES PATENT AND TRADEMARK OFFICE
CERTIFICATE OF CORRECTION

PATENT NO. : 7,798,306 B2 Page 1 of 1
APPLICATION NO. : 12/273644
DATED : September 21, 2010
INVENTOR(S) : Brayman et al.

It is certified that error appears in the above-identified patent and that said Letters Patent is hereby corrected as shown below:

Column 7
Line 25, Claim 19, "surface:" should be --surface;--;
Line 54, Claim 20, "apparatus," should be --apparatus.--

Column 8
Line 18, Claim 23, insert --:-- after "comprising";
Line 25, Claim 23, insert --:-- after "assemblies";
Line 26, Claim 23, delete "a" after "conveying"

Signed and Sealed this

Thirtieth Day of November, 2010

David J. Kappos
*Director of the United States Patent and Trademark Office*